United States Patent
Yang

(10) Patent No.: US 11,803,539 B2
(45) Date of Patent: Oct. 31, 2023

(54) METHOD OF IMPROVING EFFICIENCY OF UPDATING DATA AS TO RULES STORED IN BLOCK CHAIN, ELECTRONIC DEVICE, AND COMPUTER READABLE STORAGE MEDIUM APPLYING THE METHOD

(71) Applicant: Fulian Precision Electronics (Tianjin) Co., LTD., Tianjin (CN)

(72) Inventor: Chun-Chih Yang, Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 129 days.

(21) Appl. No.: 17/564,576

(22) Filed: Dec. 29, 2021

(65) Prior Publication Data
US 2023/0035914 A1    Feb. 2, 2023

(30) Foreign Application Priority Data
Aug. 2, 2021    (CN) .......................... 202110882789.8

(51) Int. Cl.
*G06F 7/00*      (2006.01)
*G06F 17/00*     (2019.01)
*G06F 16/23*     (2019.01)
*H04L 9/32*      (2006.01)

(52) U.S. Cl.
CPC ........ *G06F 16/2379* (2019.01); *H04L 9/3247* (2013.01)

(58) Field of Classification Search
None
See application file for complete search history.

(56) References Cited

U.S. PATENT DOCUMENTS

| 10,594,477 B2 | 3/2020 | Shao et al. |
| 2019/0188655 A1* | 6/2019 | Pandit .................. G06Q 20/223 |
| 2019/0253239 A1* | 8/2019 | Shao .................... G06Q 50/188 |
| 2020/0092085 A1* | 3/2020 | Baek ..................... H04L 9/3265 |

FOREIGN PATENT DOCUMENTS

TW        I695615 B      6/2020

* cited by examiner

*Primary Examiner* — Tuan A Pham
(74) *Attorney, Agent, or Firm* — ScienBiziP, P.C.

(57) ABSTRACT

A method of improving an efficiency of updating rule data stored in a block chain receives a rule updating request and obtains data as to the existing rule (rule data) in response to the rule updating request. Each obtained rule data is analyzed for compliance with a predefined rule strategy. When the obtained rule data is determined as complying, a priority level of each obtained rule data is confirmed. The obtained rule data is authenticated based on the priority level and a block chain authentication mechanism. When the obtained rule data is authenticated, the rule data stored in each block chain node in the block chain is updated. An electronic device and a computer readable storage medium applying the method are also provided.

14 Claims, 3 Drawing Sheets

METHOD OF IMPROVING EFFICIENCY OF UPDATING DATA AS TO RULES STORED IN BLOCK CHAIN, ELECTRONIC DEVICE, AND COMPUTER READABLE STORAGE MEDIUM APPLYING THE METHOD

FIELD

The subject matter herein generally relates to data processing, specifically to a method of improving an efficiency of updating rule data stored in a block chain, an electronic device, and a computer readable storage medium employing the method.

BACKGROUND

A block chain is a shared database and stores data and information, having features of not being forgeable, full-time marking, traceability, openness, transparency, and collective maintenance. Due to the features of the block chain, data as to rules can be stored in the block chain. The procedure for updating such data in the block chain is presently performed with low efficiency.

Thus, there is room for improvement in the art.

BRIEF DESCRIPTION OF THE DRAWINGS

Implementations of the present disclosure will now be described, by way of example only, with reference to the attached figures.

DETAILED DESCRIPTION

The present disclosure is described with reference to accompanying drawings and the embodiments. It will be understood that the specific embodiments described herein are merely part of all embodiments, not all the embodiments. In addition to the embodiments of the present disclosure, any other embodiments obtained by persons skilled in the art without creative effort shall all fall into the scope of the present disclosure.

The present disclosure provides a method of improving an efficiency of updating data as to rules (rule data) stored in a block chain, an electronic device, and a computer readable storage medium.

In the present disclosure, terms used in the specification of the present disclosure are merely intended to describe objectives of the specific embodiments, but are not intended to limit the present disclosure.

Figure 1:
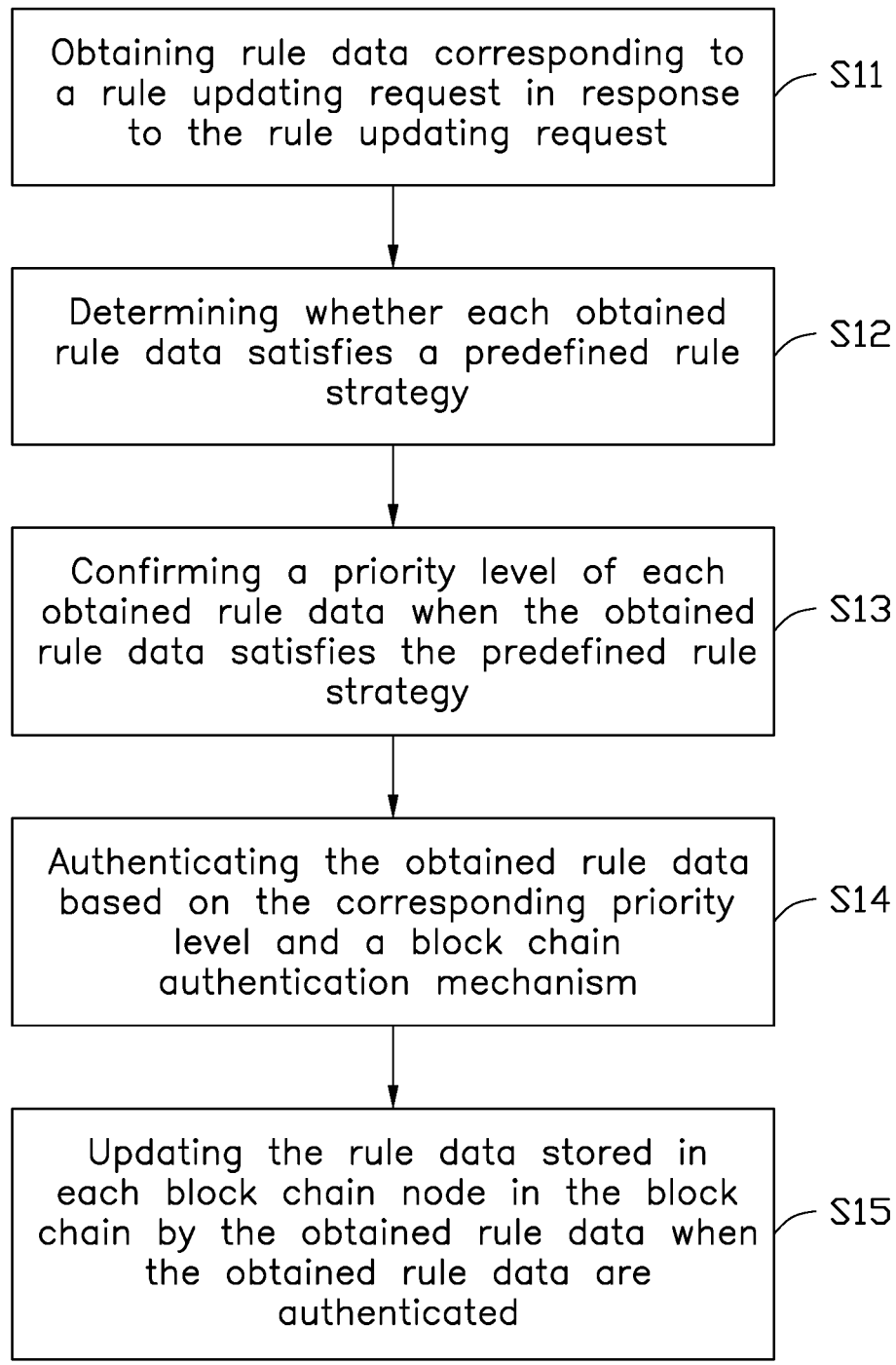
FIG. 1 is a flowchart illustrating an embodiment of a method of improving efficiency in relation to updating data as to rules stored in a block chain according to the present disclosure.

FIG. 1 shows the method. Due to different requirements, a sequence of steps in the flowchart diagram can be changed, and some steps can be omitted. The method includes the following steps, these steps may be re-ordered:

In block S11, rule data corresponding to a rule updating request are obtained in response to the rule updating request generated by a node in a block chain.

For example, when predefined rules in a terminal device are changed by a user, the block chain corresponding to the terminal device generates the rule updating request. The rule updating request can include data related to the change of the predefined rules. The terminal device can be a mobile phone, a tablet, a desk-top computer, a handheld computer, a notebook, a super mobile personal computer, a netbook, and the like. The change of the predefined rule can be adding, deleting, and/or amending rule data.

In block S12, determining whether each obtained rule data satisfies a predefined rule strategy.

The predefined rule strategy is preset. If the obtained rule data satisfies the predefined rule strategy, the obtained rule data is considered as an effective rule data, and the rule data stored in the block chain is updated by the obtained rule data. If the obtained rule data does not satisfy the predefined rule strategy, the obtained rule data is deemed ineffective rule data, and the rule data stored in the block chain is not updated.

For example, determining whether each obtained rule data includes authentication information. If the authentication information satisfies the predefined rule strategy, the obtained rule data must satisfy the predefined rule strategy. If the authentication information does not satisfy the predefined rule strategy, it means that the obtained rule data is not satisfied with the predefined rule strategy.

For another example, whether the user submitting the rule updating request includes a permission to amend the rule. If the user submitting the rule updating request includes the amending permission, it means that the obtained rule data does satisfy the predefined rule strategy. If the user submitting the rule updating request does not include the permission of amending the rule, it means that the obtained rule data is not satisfied with the predefined rule strategy.

In one embodiment, the block chain includes an endorsement node. The step of determining whether each obtained rule data satisfies the predefined rule strategy includes:

The authentication information corresponding to each obtained rule data is obtained.

The authentication information is authenticated by the endorsement node for determining whether each obtained rule data satisfies the predefined rule strategy.

The endorsement node can include a peer node in a Hyperledger frame Fabric 1.0 constructure. The endorsement node confirms whether the obtained rule data does satisfy the predefined rule strategy. For example, the authentication information of the obtained rule data is obtained, and the endorsement node authenticates the obtained data based on the authentication information, such as whether the obtained rule data is legal.

In one embodiment, the authentication information includes signature information and submitted user information. The step of authenticating the authentication information by the endorsement node for determining whether each obtained rule data does not satisfy the predefined rule strategy includes:

The signature information is authenticated by the endorsement node.

The submitted user information is authenticated by the endorsement node when the signature information is authenticated.

The obtained rule data does satisfy the predefined rule strategy when the submitted user information is authenticated.

If the signature information or the submitted user information is not authenticated, the obtained rule data does not satisfy the predefined rule strategy.

The signature information is configured to authenticate whether content in the obtained rule data is legal. The submitted user information is configured to authenticate whether the submitted has included a permission of amending the rule data.

For example, if the signature information is authenticated, the obtained rule data is legal. If the signature information is not authenticated, the obtained rule data is illegal. When the signature information is authenticated, the submitted user information is authenticated. If the submitted user information is authenticated, the submitted user has included a permission of amending the rule data, and the obtained rule data is effective. If the submitted user information fails to be authenticated, the submitted user has not included permission of amending the rule data, and the obtained rule data is ineffective.

In block S13, a priority level of each obtained rule data is confirmed when the obtained rule data does satisfy the predefined rule strategy.

Different rule data correspond to different priority levels. The rule data with a high priority level is updated before the rule data with a low priority level.

For example, the priority level is confirmed based on a controlling Order node. The controlling Order node also sorts the obtained rule data based on the corresponding priority levels.

Figure 2:
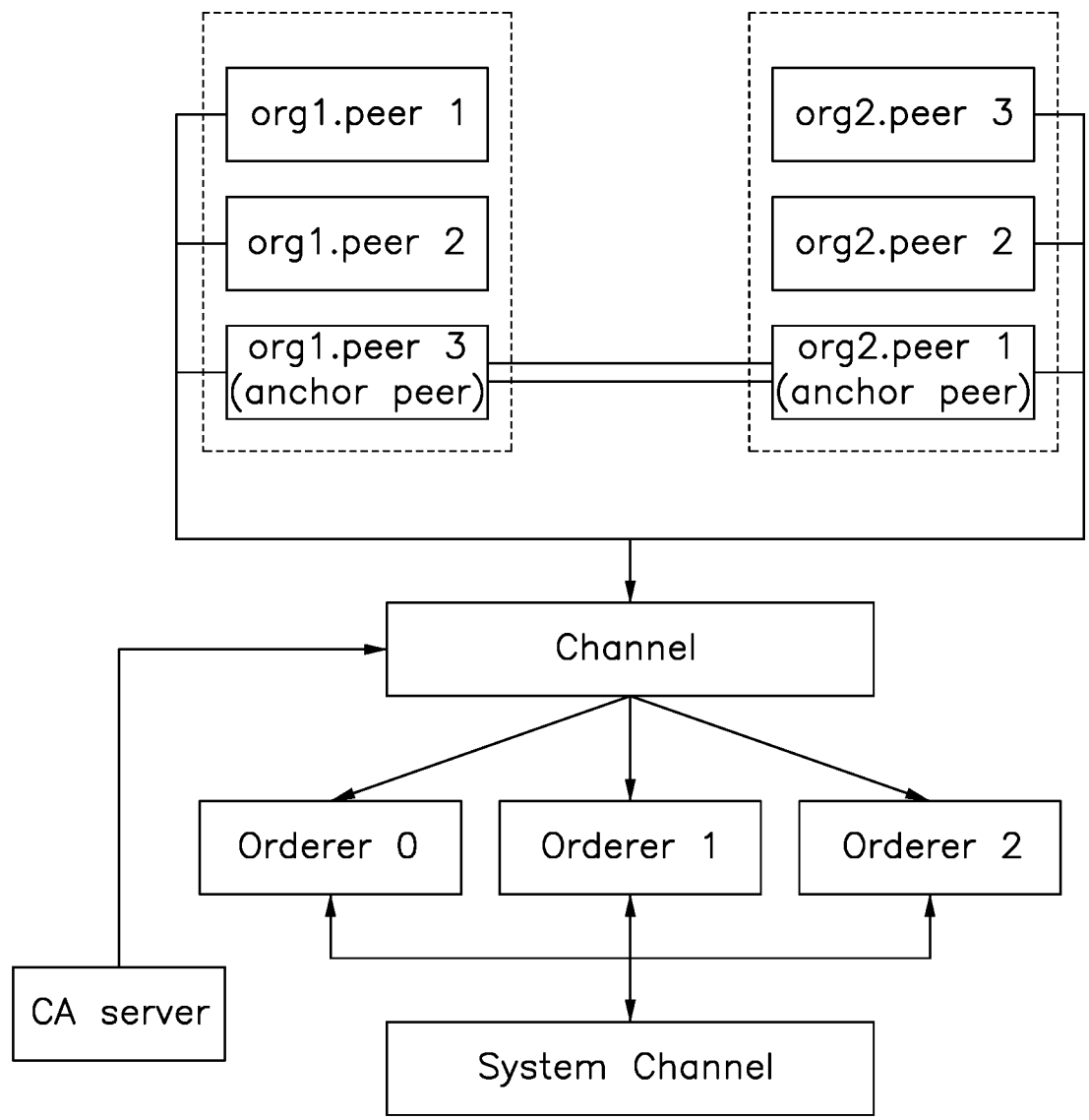
FIG. 2 is a diagram illustrating an embodiment of a block chain network according to the present disclosure.

As shown in FIG. 2, the block chain can include multiple organizations, such as Organization1, Organization2. Each organization includes multiple peer nodes. The peer node is used for authenticating the obtained rule data. The obtained rule data passing authentication are transmitted to a sequencing module through a predefined channel. The sequencing module communicates with a system channel. The sequencing module can include multiple order nodes. The order nodes are configured to sort the obtained rule data.

In one embodiment, the step of confirming the priority level corresponding to the obtained rule data includes:

A request corresponding to the rule updating request is obtained.

A message segment identifier corresponding to the request is obtained from a configuration label database.

The request is segmented based on the message segment identifier to obtain identifier fragments.

The priority level corresponding to the obtained rule data is confirmed based on the configuration label database and the identifier fragments.

For example, the configuration label database is preset. The configuration label database stores a plurality of message segment identifiers corresponding to different message segments, such as the identifier fragments corresponding to the message segment identifier. The message segment identifier is configured to label a position for cutting the message. Based on the position of the message segment identifier, the request message corresponding to the rule updating request is cut, and the identifier fragments are obtained. The identifier fragments include the data information corresponding to the obtained rule data.

The priority level corresponding to the obtained rule data is confirmed based on the configuration label database and the identifier fragments. For example, the configuration label database is preset, the configuration label database includes a mapping relationship between the identifier fragments and the priority levels, such as an identifier fragment A corresponding to a first priority level, an identifier fragment B corresponding to a second priority level.

In block S14, the obtained rule data is authenticated based on the corresponding priority level and a block chain authentication mechanism.

For example, the peer node sorts the obtained rule data based on the block chain authentication mechanism and the priority level corresponding to the obtained rule data. The peer node authenticates a validity of the obtained rule data. The obtained rule data with a high priority is authenticated before the obtained rule data with a low priority. When the obtained rule data is authenticated by the peer node, the peer node transmits the obtained rule data to a next node. When the obtained rule data fails to authenticate, the peer node considers the obtained rule data to be ineffective and abandons the obtained rule data. Thus, the obtained rule data fails to be transmitted to the next node, and a computing source is reduced.

The operation of authenticating the obtained data by the peer node is based on several authentication protocols in the block chain, such as a format of a transaction, a data construction of the transaction, a grammar construction of the format, an input and output, and an accuracy of a digital signature, and the like.

In block S15, the rule data stored in each block chain node of the block chain is updated by the obtained rule data when the obtained rule data is authenticated.

For example, when all of the obtained rule data are authenticated, the peer node puts the obtained rule data in a transaction pool. When a block is selected, the peer node obtains Merkle root based on a priority level sequence for transaction computing. The peer node updates the original rule data stored in each block chain node in the block chain based on the Merkle root.

In one embodiment, the method further includes:

A request for accessing the block chain generated by a node is obtained, and a node data corresponding to the request for accessing the block chain is obtained.

Whether the node satisfies an accessing standard of the block chain is determined based on the node data.

The rule data stored in the node is updated by the obtained rule data when the node satisfies the accessing standard of the block chain.

For example, when receiving the request for accessing the block chain generated by the node, the node data corresponding to the node is obtained. Determining whether the node satisfies an accessing standard of the block chain based on the node data. The rule data stored in the node is updated by the obtained rule data when the node satisfies the accessing standard of the block chain.

Such as, when a new node intends to access the block chain, a request sent by the new node is received. Whether the new node can take access is determined based on the apply request. When the new node is not allowed to access the block chain, node information corresponding to the new node is abandoned. When the new node can access the block chain, the node information of the new node is authenticated. When the node information authenticates, the rule data corresponding to the block chain is obtained, and the rule data stored in the new node is updated based on the obtained rule data.

In one embodiment, the method further includes:

When the node fails to meet the standard of the block chain, a reject is generated according to a predefined rule of prompting.

By generating a prompt, repetition of the operation of submitting the accessing request corresponding to a same node is avoided, and a resource is saved.

In one embodiment, the block chain uses an asymmetric encryption technology for encrypting the rule data, a security of the rule data is ensured, and an efficiency of updating the rule data is improved.

In one embodiment, the block chain uploads time data in each operation of updating the rule data based on a timestamp technology. Traceability and an authentication of the rule data can be ensured, and an efficiency of updating the rule data is improved.

Based on the method of improving an efficiency of updating rule data stored in a block chain, the rule data corresponding to the rule updating request is obtained. Whether each obtained rule data satisfies a predefined rule strategy is determined. When the obtained rule data does satisfy a predefined rule strategy, the priority level of each obtained rule data is confirmed. The rule data is authenticated based on the corresponding priority level and the block chain authentication mechanism. When the rule data is authenticated, the rule data stored in the block chain node of the block chain is updated by the obtained rule data. There are multiple determining operations for improving an accuracy of updating the rule data. Meantime, the priority level corresponding to the rule data is confirmed and is used for authenticating the rule data, thus the efficiency of updating the rule data is improved. Therefore, both the efficiency and the accuracy of updating the rule data are improved.

Figure 3:
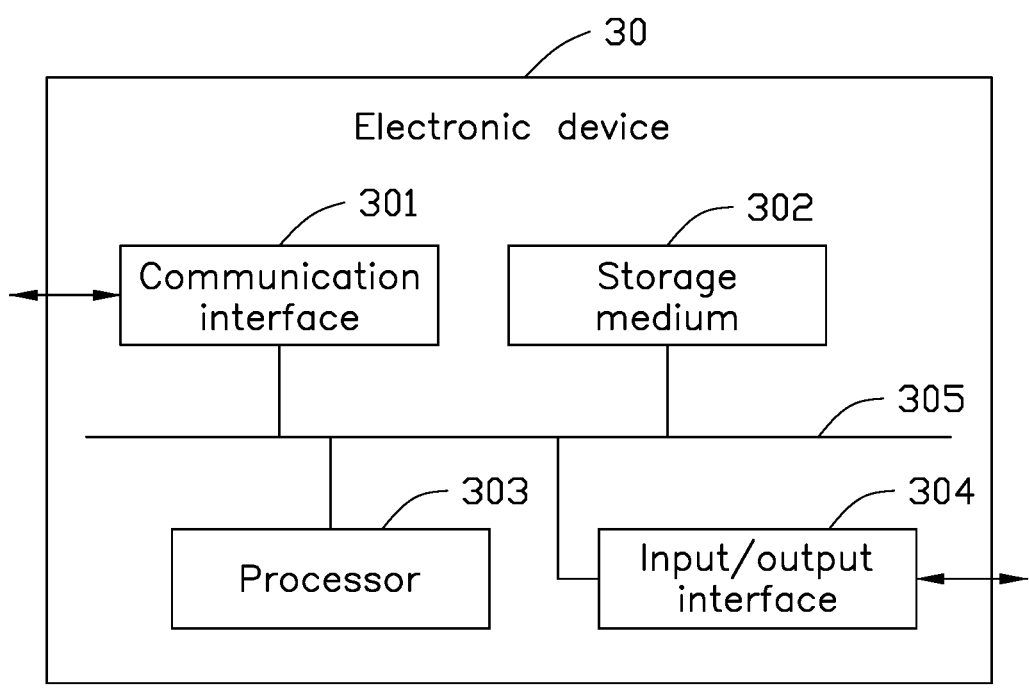
FIG. 3 is a diagram illustrating an embodiment of an electronic device according to the present disclosure.

As shown in FIG. 3, an electronic device 30 can be a server or a terminal device.

A network of the electronic device 30 can be an internet, a wide area network, a metropolitan area network, a local area network, a virtual private network (VPN), and the like.

As shown in FIG. 3, the electronic device 30 includes a communication interface 301, storage medium 302, a processor 303, an input/output (I/O) interface 304, and a bus 305. The processor couples with the communication interface 301, the storage medium 302, and the I/O interface 304, through the bus 305.

The communication interface 301 is configured to communicate. The communication interface 301 can be an interface in the electronic device 30, and also can be a new interface, such as a wireless local area network (WLAN) interface, a cellular network interface, or a combination, and the like.

The storage medium 302 can store operation system and computer programs. For example, the computer programs stored in the storage medium 302 are executed to implement the above method.

It is understood that, the storage medium 302 can include a program storing region and a data storing region. The program storing region stores the operation system and programs required by a method, such as the above method. The data storage region stores data created while the electronic device 30 operates. The storage medium 302 can be a random-access storage medium, or a non-volatile storage medium, such as a hard disk, a memory, a plug-in hard disk, a smart media card (SMC), a secure digital (SD), a flash card, a disk storage component, a flash component, or other volatile solid memory.

The processor 303 provides computing ability and control techniques supporting the operation of the electronic device 30. For example, the processor 303 is configured to execute the computer programs stored in the storage medium 302 for implementing the steps in the above method.

The processor 303 can be a central processing unit (CPU), or other universal processor, such as a digital signal process (DSP), an application specific integrated circuit (ASIC), a field-programmable gate array (FPGA), or other programmable logic component, discrete gate or transistor logic, discrete hardware components, and so on. The universal processor can be a microprocessor or the at least one processor can be any regular processor, or the like.

The I/O interface 304 provides an input or an output path for users. For example, the I/O interface 304 can connect with various input and output devices (a mouse, a keyboard, or a 3D touch device, and the like) and a display for inputting information by the users or making information to be visible.

The bus 305 provides communication paths between the communication interface 301, the storage medium 302, the processor 303, and the I/O interface 304.

A person skilled in the art may understand that, the structure shown in FIG. 3 is merely an exemplary block diagram of a partial structure related to the solutions of this application, and does not constitute a limitation to the computer device to which the solutions of this application are applied, and a specific electronic device may include more or fewer components than those shown in the figure, or some components may be combined, or a different component deployment may be used.

In one embodiment, when the computer programs stored in the storage medium 302 are executed by the processor 303 for implementing the method of improving an efficiency of updating rule data stored in a block chain, which cause the processor 303 to implement the following steps:

Rule data corresponding to a rule updating request are obtained in response to the rule updating request generated from a node in a block chain.

Whether each obtained rule data satisfies a predefined rule strategy is determined.

A priority level of each obtained rule data is confirmed when the obtained rule data does satisfy the predefined rule strategy.

The obtained rule data is authenticated based on the corresponding priority level and a block chain authentication mechanism.

The rule data stored in each block chain node of the block chain are updated by the obtained rule data when the obtained rule data is authenticated.

The method of implementing of the above instructions executed by processor 303 can reference the related steps in the above method, the detail description will not repeat.

The present disclosure further provides a computer readable storage medium. The computer readable storage medium stores computer programs. The computer programs include program instructions. The program instructions can be executed to implement the method of improving an efficiency of updating rule data stored in a block chain.

The computer readable storage medium can be an internal storage unit in the electronic device 30, such as a hard disk or a memory in the electronic device 30. The computer readable storage medium can be an external storage device besides the electronic device 30, such as a plug-in hard disk, a smart media card (SMC), a secure digital (SD) card, a flash card, and the like.

Further, the computer readable storage medium can include a program storing region and a data storing region. The program storing region stores the operation system and programs required by a method, such as the above method. The data storage region stores data created while the electronic device 30 operates.

Based on the electronic device 30 and the computer readable storage medium, the rule data corresponding to the rule updating request are obtained. Whether each obtained rule data does satisfy a predefined rule strategy is determined. When the obtained rule data does satisfy a predefined rule strategy, the priority level of each obtained rule data is confirmed. The rule data is authenticated based on the corresponding priority level and the block chain authentication mechanism. When the rule data authenticates, the rule data stored in the block chain node of the block chain is updated by the obtained rule data. There are multiple determinations which are made, improving an accuracy of updating the rule data. Meantime, the priority level corresponding to the rule data is confirmed and is used for authenticating the rule data, thus the efficiency of updating the rule data is improved. Therefore, both the efficiency and the accuracy of updating the rule data are improved.

The term used in the description of the present disclosure herein is for the purpose of describing particular embodiments only and is not intended to be limiting of the invention. As used in the description of the present disclosure and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items. It will be further understood that the terms the terms "include", "includes" and other variants are intended to cover nonexclusive inclusion, so that the process, method, object or system which includes a series of elements not only includes such elements but also further includes other elements which are not clearly listed, or intrinsic elements of the process, method, object or system. In the case of no more limitations, an element defined by a sentence "include a . . . " does not exclude other same elements existing in the process, method, object or system which includes the element.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of improving an efficiency of updating rule data used in a block chain; the method comprises:
    obtaining rule data corresponding to a rule updating request in response to the rule updating request, the block chain comprising an endorsement node;
    determining whether each obtained rule data satisfies a predefined rule strategy, comprising: obtaining authentication information corresponding to the obtained rule data; and authenticating the authentication information by the endorsement node for determining whether the obtained rule data satisfies the predefined rule strategy;
    confirming a priority level of each obtained rule data, when the obtained rule data satisfies the predefined rule strategy;
    authenticating the obtained rule data based on the corresponding priority level and a block chain authentication mechanism; and
    updating the rule data stored in each block chain node in the block chain by the obtained rule data, when the obtained rule data is authenticated;
    wherein the authentication information comprises signature information and submitted user information, the signature information is configured to authenticate whether content in the obtained rule data is legal, the submitted user information is configured to authenticate whether a user that submits the rule data has included a permission of amending the rule data;
    the step of authenticating the authentication information by the endorsement node comprises:
    authenticating the signature information by the endorsement node;
    authenticating the submitted user information by the endorsement node, when the signature information is authenticated;
    confirming the obtained rule data to be satisfied the predefined rule strategy, when the submitted user information is authenticated; and
    confirming obtained rule data to be not satisfied the predefined rule strategy, when the signature information or the submitted user information fails to authenticate.

2. The method of claim 1, wherein the method further comprises:
    obtaining a request for accessing the block chain generated by a node, and obtaining a node data corresponding to the request for accessing the block chain;
    determining whether the node satisfies an accessing standard of the block chain based on the node data; and
    updating the rule data stored in the node by the obtained rule data, when the node satisfies the accessing standard of the block chain.

3. The method of claim 2, wherein the method further comprises:
    generating reject prompt according to a predefined rule of prompting, when the node fails to meet the standard of the block chain.

4. The method of claim 1, wherein the step of confirming a priority level of each obtained rule data comprises:
    obtaining a request corresponding to the rule updating request;
    obtaining a message segment identifier corresponding to the request from a configuration label database;
    segmenting the request based on the message segment identifier to obtain identifier fragments; and
    confirming the priority level corresponding to the obtained rule data based on the configuration label database and the identifier fragments.

5. The method of claim 1, wherein the block chain uses an asymmetric encryption technology for encrypting the rule data.

6. The method of claim 1, wherein the block chain uploads a time data in each operation of updating the rule data based on a timestamp technology.

7. An electronic device comprises a processor and a storage medium; the storage medium stores computer programs; the computer programs are executed by the processor, which cause the processor to:
    obtain rule data corresponding to a rule updating request in response to the rule updating request, the block chain comprising an endorsement node;
    determine whether each obtained rule data satisfies a predefined rule strategy, comprising: obtaining authentication information corresponding to the obtained rule data; and authenticating the authentication information by the endorsement node for determining whether the obtained rule data satisfies the predefined rule strategy;
    confirm a priority level of each obtained rule data, when the obtained rule data satisfies the predefined rule strategy;

authenticate the obtained rule data based on the corresponding priority level and a block chain authentication mechanism; and update the rule data stored in each block chain node in the block chain by the obtained rule data, when the obtained rule data is authenticated;

wherein the authentication information comprises signature information and submitted user information, the signature information is configured to authenticate whether content in the obtained rule data is legal, the submitted user information is configured to authenticate whether a user that submits the rule data has included a permission of amending the rule data;

the step of authenticating the authentication information by the endorsement node comprises:

authenticating the signature information by the endorsement node;

authenticating the submitted user information by the endorsement node, when the signature information is authenticated;

confirming the obtained rule data to be satisfied the predefined rule strategy, when the submitted user information is authenticated; and confirming obtained rule data to be not satisfied the predefined rule strategy, when the signature information or the submitted user information fails to authenticate.

8. The electronic device of claim 7, wherein the processor further to:

obtain a request for accessing the block chain generated by a node, and obtain a node data corresponding to the request for accessing the block chain;

determine whether the node satisfies an accessing standard of the block chain based on the node data; and update the rule data stored in the node by the obtained rule data, when the node satisfies the accessing standard of the block chain.

9. The electronic device of claim 8, wherein the processor further to:

generate reject prompt according to a predefined rule of prompting, when the node fails to meet the standard of the block chain.

10. The electronic device of claim 7, wherein the processor further to:

obtain a request corresponding to the rule updating request;

obtain a message segment identifier corresponding to the request from a configuration label database;

segment the request based on the message segment identifier to obtain identifier fragments; and confirm the priority level corresponding to the obtained rule data based on the configuration label database and the identifier fragments.

11. A computer readable storage medium stores program codes; the program codes are executed by at least one processor to implement the following steps:

obtaining rule data corresponding to a rule updating request in response to the rule updating request, the block chain comprising an endorsement node;

determining whether each obtained rule data satisfies a predefined rule strategy, comprising: obtaining authentication information corresponding to the obtained rule data; and authenticating the authentication information by the endorsement node for determining whether the obtained rule data satisfies the predefined rule strategy;

confirming a priority level of each obtained rule data, when the obtained rule data satisfies the predefined rule strategy;

authenticating the obtained rule data based on the corresponding priority level and a block chain authentication mechanism; and updating the rule data stored in each block chain node in the block chain by the obtained rule data, when the obtained rule data is authenticated;

wherein the authentication information comprises signature information and submitted user information, the signature information is configured to authenticate whether content in the obtained rule data is legal, the submitted user information is configured to authenticate whether a user that submits the rule data has included a permission of amending the rule data;

the step of authenticating the authentication information by the endorsement node comprises:

authenticating the signature information by the endorsement node;

authenticating the submitted user information by the endorsement node, when the signature information is authenticated;

confirming the obtained rule data to be satisfied the predefined rule strategy, when the submitted user information is authenticated; and confirming obtained rule data to be not satisfied the predefined rule strategy, when the signature information or the submitted user information fails to authenticate.

12. The computer readable storage medium of claim 11, wherein the step further comprises:

obtaining a request for accessing the block chain generated by a node, and obtaining a node data corresponding to the request for accessing the block chain;

determining whether the node satisfies an accessing standard of the block chain based on the node data; and updating the rule data stored in the node by the obtained rule data, when the node satisfies the accessing standard of the block chain.

13. The computer readable storage medium of claim 12, wherein the step further comprises:

generating reject prompt according to a predefined rule of prompting, when the node fails to meet the standard of the block chain.

14. The computer readable storage medium of claim 11, wherein the step of confirming a priority level of each obtained rule data comprises:

obtaining a request corresponding to the rule updating request;

obtaining a message segment identifier corresponding to the request from a configuration label database;

segmenting the request based on the message segment identifier to obtain identifier fragments; and confirming the priority level corresponding to the obtained rule data based on the configuration label database and the identifier fragments.

* * * * *